United States Patent
Nonni

(10) Patent No.: US 12,443,930 B2
(45) Date of Patent: Oct. 14, 2025

(54) DECENTRALIZED NETWORK WITH NEAR INSTANTANEOUS TERMINAL TRANSFERS

(71) Applicant: NCR Atleos Corporation, Atlanta, GA (US)

(72) Inventor: Bryan Walser Nonni, Atlanta, GA (US)

(73) Assignee: NCR Atleos Corporation, Atlanta, GA (US)

(*) Notice: Subject to any disclaimer, the term of this patent is extended or adjusted under 35 U.S.C. 154(b) by 602 days.

(21) Appl. No.: 17/695,353

(22) Filed: Mar. 15, 2022

(65) Prior Publication Data
US 2023/0298034 A1    Sep. 21, 2023

(51) Int. Cl.
| | | |
|---|---|---|
| G06Q 20/10 | (2012.01) | |
| G06Q 20/06 | (2012.01) | |
| G06Q 20/22 | (2012.01) | |
| G06Q 20/36 | (2012.01) | |
| G06Q 20/38 | (2012.01) | |
| G06Q 20/40 | (2012.01) | |

(52) U.S. Cl.
CPC ........... G06Q 20/10 (2013.01); G06Q 20/227 (2013.01); G06Q 20/367 (2013.01); G06Q 20/0658 (2013.01); G06Q 20/382 (2013.01); G06Q 20/4037 (2013.01); G06Q 2220/00 (2013.01)

(58) Field of Classification Search
CPC ........... G06Q 20/0658; G06Q 20/3674; G06Q 20/382; G06Q 20/36; G06Q 20/401; G06Q 20/4037; G06Q 2220/00

USPC ........................................................... 705/75
See application file for complete search history.

(56) References Cited

U.S. PATENT DOCUMENTS

| | | | |
|---|---|---|---|
| 10,055,715 B1* | 8/2018 | Grassadonia | G06Q 20/36 |
| 2011/0208640 A1* | 8/2011 | Geoghegan | G06Q 20/10 705/39 |
| 2020/0013045 A1* | 1/2020 | Spalding | G06Q 20/065 |
| 2020/0342428 A1* | 10/2020 | Benkreira | G07D 11/30 |
| 2021/0158339 A1* | 5/2021 | Tollo | G06Q 20/3829 |
| 2022/0414625 A1* | 12/2022 | White | G06Q 20/10 |

FOREIGN PATENT DOCUMENTS

KR    20090036040 A    *    4/2009    ............ G06Q 40/02

* cited by examiner

Primary Examiner — John W Hayes
Assistant Examiner — Wodajo Getachew
(74) Attorney, Agent, or Firm — Schwegman Lundberg & Woessner, P.A.

(57) ABSTRACT

A cloud-based service creates and maintains custodial digital wallets for parties to value transfers. Each wallet funded by the corresponding party with cryptocurrency and/or a fiat currency. The cloud-based service provides value transfers between two parties having custodial wallets without any on-chain blockchain operations making such transfers nearly instantaneous. The cloud-based service also provides transfers between one party with a custodial wallet and another party without a custodial wallet by using a liquidity wallet and/or a liquidity account to perform the transfers nearly instantaneously and by initiating any needed blockchain operations on the blockchain to properly reflect any debit or redemption made from the liquidity wallet on the blockchain.

7 Claims, 3 Drawing Sheets

DECENTRALIZED NETWORK WITH NEAR INSTANTANEOUS TERMINAL TRANSFERS

BACKGROUND

Bitcoin transaction do not scale to a level of competition to compete with major card networks like Visa® and Mastercard®. A Bitcoin transaction can take up to 10 minutes or more and can experience more fees than expected, if processed during high transaction volumes on the blockchain.

The lack of large-scale retail adoption of cryptocurrencies is largely due to the processing time it takes to complete a transfer over the blockchain. It is simply unrealistic to expect a business and a customer to wait 10 minutes or more for a payment transfer in a brick-and-mortar store where other customers are waiting to checkout.

Valuation is another risk to retail adoption of cryptocurrency, since cryptocurrency are still experiencing significant valuation moves over very short periods of time. However, this risk has been substantially eliminated with the introduction of stable cryptocurrencies that directly track their value to the U.S. dollar, such as the United States Dollar Coin (USDC). Now, a retailed can accept a cryptocurrency and immediately use it to purchase equivalent amounts in USDCs. As a result, there is little risk to the retailer and the retailer does not have to attempt to time the market to offload a particular cryptocurrency into U.S. dollars, since USDC track directly to the valuation in the dollar.

As a result, one of the last major impediments to large-scale retail adoption of cryptocurrency is the processing time required to transfer funds through the blockchain from a consumer's digital wallet to a retailer's digital wallet. Additionally, fee increases during heavy blockchain usage presents concerns for the retailers, since retailers would like to know the wallet-to-wallet transfer fees in advance and would like for such fees to be constant.

SUMMARY

In various embodiments, methods and a system for near instantaneous terminal transfers over a blockchain using a decentralized network are presented.

According to an embodiment, a method for a near instantaneous terminal payment transfer of the blockchain using a decentralized network. Specifically, and in one embodiment, a party is registered to a custodial digital wallet and initial value funds for the custodial digital wallet are obtained from the party. A request is received from the party to perform a transfer of a portion of the initial value funds to a second party. The portion of the initial value funds is transferred to a designated location associated with the second party without confirmation from any blockchain operations associated with a blockchain. A ledger that is maintained for the custodial digital wallet is updated to reflect the initial value funds and the transfer of the portion to the designated location of the second party.

DETAILED DESCRIPTION

Figure 1:
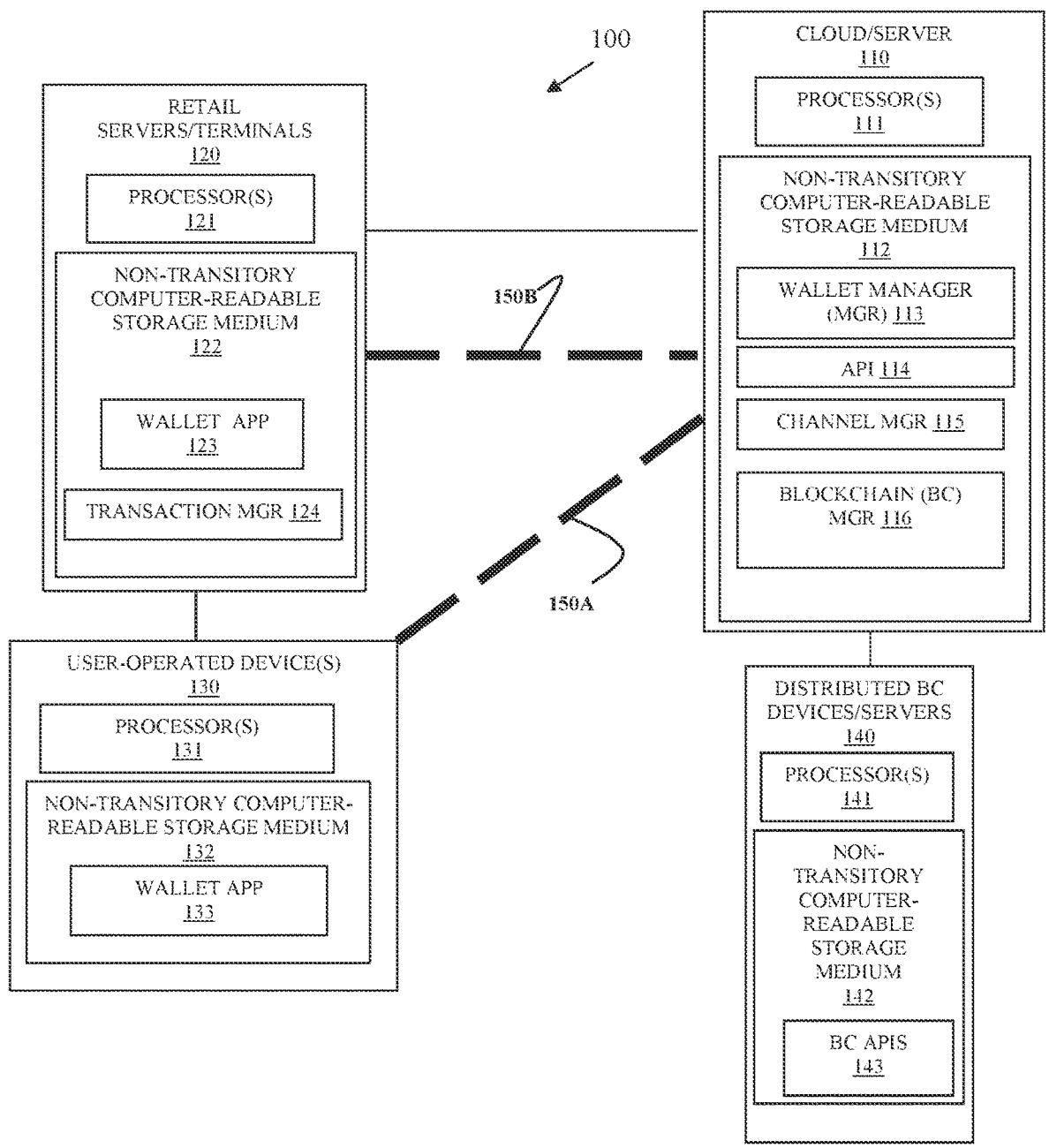
FIG. 1 is a diagram of a system for near instantaneous terminal transfers over a blockchain using a decentralized network, according to an example embodiment.

FIG. 1 is a diagram of a system 100 for near instantaneous terminal transfers over a blockchain using a decentralized network, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from near instantaneous terminal transfers over a blockchain using a decentralized network presented herein and below.

Moreover, various components are implemented as one or more software modules, which reside in non-transitory storage and/or hardware memory as executable instructions that when executed by one or more hardware processors perform the processing discussed herein and below.

System 100 provides verifiable techniques by which a consumers, retailers, and/or any entities can perform any kind of value transaction with near instantaneous transfers between them. The value transactions can comprise cryptocurrencies of different types and/or government-backed or fiat currencies. For example, a consumer can pay a retailer using bitcoin and the retailer receives a U.S. dollar transfer equivalent to the bitcoin amount provided by the consumer. A consumer can purchase bitcoin for use at a later date with a retailer or for other purposes. A retailer can receive payments for transactions as cryptocurrency or fiat currency from consumers. Any cryptocurrency used during a transfer is still recorded on the blockchain (BC) if the BC is required to initially fund or cash out of system 100, the transfers within system 100 are near instantaneous avoiding the blockchain until a BC operation is needed when the channel closes (a party cashes out or transfers out funds in their custodial wallets to other BC wallets).

An intermediary channel manager between two parties to a value transfer establishes an open channel for the parties subject to a contract between each of the parties and the intermediary channel manager (the terms of the contract can be a smart contract). The intermediary channel manager performs the transfer for the channel between the parties near instantaneously. This avoids the confirmation and BC time lag required to move cryptocurrency between wallets associated with the BC while ensuring that such confirmations are processed and are recorded on the BC when the transfer is eventually closed. However, the closing of a channel is not done often and not a requirement when both parties have trust between them. Each party maintains a wallet with the system 100 from which value funds can be deposited, withdrawn, and transferred. System 100 maintains both a liquidity wallet and a liquidity account used to perform near instantaneous transfers between the parties. If a given transfer is associated with cashing out to a private wallet or funding a system 100 wallet from the BC, then the funds are transferred accordingly from (cashing out) or to (funding) using the liquidity wallet and the provided private wallet by processing the BC operations on the BC.

As used herein "a party" refers to an entity or a consumer that is engaged in a value transfer of funds to another entity or another consumer using system 100. Each value transfer comprises at least 2 parties and at least one of the parties is system 100. An "entity" comprises any retailer, government agency, or organization. A "value transfer" is a purchase or a transfer of "value funds." "Value funds" comprise a fiat currency or different types of cryptocurrencies.

System 100 comprises a cloud/server 110, retail servers/terminals 120, user or consumer-operated devices 130, and a plurality of distributed BC devices/servers (nodes).

Cloud/Server 110 comprises at least one processor 111 and a non-transitory computer-readable storage medium 112. Medium 112 comprises executable instructions for a wallet manager 113, an Application Programming Interface (API) 114, a channel manager 115, and a BC manager 116. When the processor 111 obtains or is provided the executable instructions from medium 112, this causes the at processor 111 to perform the operations discussed herein and below with respect to 113-116.

Each retail server/Terminal 120 at least one processor 121 and a non-transitory computer-readable storage medium 122. Medium 122 comprises executable instructions for a wallet application (app) 123 and a transaction manager 125. When the processor 121 obtains or is provided the executable instructions from medium 122, this causes the at processor 121 to perform the operations discussed herein and below with respect to 123-124.

Each user-operated device 130 comprises at least one processor 132 and a non-transitory computer-readable storage medium 133. Medium 133 comprises executable instructions for a wallet app 133. When the processor 131 obtains or is provided the executable instructions from medium 132, this causes the at processor 131 to perform the operations discussed herein and below with respect to 133.

Each distributed BC device/server (node) 140 comprises at least one processor 141 and a non-transitory computer readable storage medium 142. Medium 140 comprises executable instructions for BC APIs 143. When the executable instructions are provided to corresponding processor 141, this causes processor 141 to perform operations discussed herein and below for BC APIs 143.

System 100 uses a layer on top of the BC through which channels are created for value transfers between parties (one of which is channel manager 115). A party can purchase cryptocurrency with a fiat currency at a terminal 120 (Automated Teller Machine (ATM), Self-Service Terminal (SST), or cashier-assisted Point-Of-Sale (POS) terminal), redeem cryptocurrency to dispense cash (fiat currency) at terminal 120 or use cryptocurrency as payment for a transaction at terminal 120. In fact, transfers and redemptions between any value currency (cryptocurrency or fiat currency) are achieved near instantaneously via system 100.

Each party initially establishes a wallet with wallet manager 113 via a wallet app 123 and/or 133. The corresponding wallet can be funded in a variety of manners, such as by purchasing cryptocurrency with a fiat currency or by transferring existing cryptocurrency associated with a different private wallet to a custodial wallet created during interaction between wallet app 123 and/or wallet app 133 and wallet manager 113. During funding of the corresponding custodial wallet a channel 150A and/or 150B is established between app 133/123 and a channel manager 115. Terms associated with a contract are established and consented to by the party via a user-facing interface of app 133/123. The contract is between cloud/server 110 and each party that is establishing a custodial wallet for a first time.

A user-facing interface of transaction manager 124 for server 120 for terminal 120 is enhanced to include an option to signup and establish a custodial wallet with cloud/server 110. This permits initial signup and establishing of the custodial wallet with cloud/server 110 by a customer/consumer via an online retail server 120 and via an instore terminal 120 of a given retailer. The user-facing interface of transaction manager 124 is further enhanced during a payment workflow for a transaction with a customer/consumer to provide a payment method via the custodial wallet once established and funded.

It is noted that a party, such as a consumer, can signup for, fund, and use a custodial wallet during checkout through interaction with channel manager 115 and wallet app 123 from a terminal 120 of a store.

Any initial funding of a custodial wallet that includes a transfer of cryptocurrency residing in a separate private wallet of the consumer causes the corresponding transfer to immediately start the BC operations on the BC (by BC manager 116 through BC APIs 143) to move the funds from the personal wallet of the consumer to a liquidity wallet held by cloud/server 110. The custodial wallet of the consumer is instantly transferred the funds into the custodial wallet from cryptocurrency held in a liquidity wallet by cloud/server 110. The consumer is not restricted in using the funds deposited while the transfer from the personal wallet to the liquidity wallet is pending confirmation from the BC APIs 143. Acknowledgment of starting the transfer on the BC provided by BC APIs 143 is nearly instantaneous received from BC manager 116 and will process and will show up should the consumer immediately attempt a second transfer of the same funds on the BC. In this way, cloud/server 110 is assured that the funds will eventually be confirmed as being received and validated from the BC and there is little to no risk at all that the transfer will not occur once initiated on the BC.

Channel manager 115 and BC manager also cooperate to transfer funds between two registered custodial wallets of two parties. For example, in an instance where a first party is a consumer operating device 130 and a second party is a retailer responsible for operating server 120 or terminal 120 and the consumer desires to pay for a transaction with the retailer via custodial wallets, channel manager 115 uses channel 150A to confirm a fund type and fund amount transfer from a custodial wallet of the consumer and channel 150B to confirm the fund type and fund amount transferred to a custodial wallet of the retailer. Confirmation is nearly instantaneous. If a transfer requires use of a private wallet of either of the two parties using cryptocurrency, the corresponding funds that need to be moved on the BC is handled via an initiation of the transfer by BC manager 116 and the transfer is recorded as soon as an acknowledgement is received by BC manager from the BC via the BC APIs 143. In the case, where a custodial wallet of the consumer has enough funds to transfer to the retailer for payment, the BC operations may be used to cash out some cryptocurrency for a fiat currency from the liquidity wallet if the retailer desires the payment in the fiat currency. In the case, where the transfer does not require any cashing out from the liquidity wallet, the funds are merely flagged by BC manager 116 as moving from the consumer's custodial wallet to the retailer's custodial wallet within the liquidity wallet and/or liquidity account, and no BC operations are necessary on the BC. Each custodial wallet includes a ledger that is maintained by channel manager 113, such that balances and transfers to and from a given ledger are maintained and up-to-date for each party and their custodial wallet.

In this way, the BC manager 116 maintains a ledger for the parties indicating the type of funds held in each custodial wallet, a fund type amount per fund type (cash or cryptocurrency types (USDC, Bitcoin, Ethereum, etc.)), a total current balance in each custodial wallet in a fiat currency (such as U.S. dollars), and all transactions (transfers) in and out that are performed on the custodial wallet associated with the ledger. A value of each fund type is obtained by BC manager 116 using API 114 to continuously and regularly interact with a cryptocurrency exchange. The value of each fund type is also provided via API 114 to a transaction interface of transaction manager 124 or to wallet app 133 when a consumer is desiring to pay for a transaction with the fund type held in the custodial wallet, desiring to redeem the fund type, and/or desiring to purchase the fund type to provide the consumer with up-to-date and current values of cryptocurrency (in a given fiat currency).

The liquidity wallet holds the funds held in the custodial wallets in a variety of fund types such as USDC, Bitcoin, Ethereum, U.S. dollars, etc. As funds are needed to transfer out of a custodial wallet for cash payments, cash withdrawals, transfers to non-custodial wallets, and/or cash/fiat currency transfers (bank to bank), BC manager 116 initiates any needed BC transfer via BC APIs 143 to redeem or to transfer the funds from the liquidity wallet to the party, to a financial account of the party, and/or to a non-custodial wallet of the party. Cash or a fiat currency is maintained in the liquidity account, such that when a party desires cash, the amount is transferred from the liquidity account to a financial account associated with the party.

A variety of operational scenarios of system 100 can be achieved.

For example, a consumer may operate an ATM 120 or an SST 120 to create a custodial wallet with cloud/server 110 and purchase 0.01 Bitcoin to fund the custodial wallet. The transaction interface of transaction manager 124 on the ATM or SST 120 presents the option to the consumer and the current price of (e.g., $585.14) for the purchase and asks how the consumer wishes to buy the 0.01 bitcoin. A secure channel 150B is already opened by channel manager 115 between ATM 120 and cloud/server 110. The consumer selects a source for $585.14, such as a debit card inserted into a card reader of the ATM 120, cash provided via a cash slot of a depository of the ATM 120, or via a non-custodial wallet that comprises other cryptocurrency held by the consumer in a private cryptocurrency wallet (here the transaction interface displays a wallet QR code on a screen of the ATM and asks the consumer to scan the QR code using their private wallet application and using the liquidity wallet 0.01 bitcoin is transferred nearly instantaneously from the liquidity wallet to the custodial wallet and simultaneously the transfer from the private wallet to the liquidity wallet is initiated and acknowledged to the BC manager 116 by the BC APIs 143.

In another example, a consumer is operating terminal 120 or user-operated device 130 and already has a custodial wallet with cloud/server 110. The consumer desires to pay a retailer for a purchase transaction using the custodial wallet. The retailer may have an existing custodial wallet, in which case the payment is immediate over channels 150A and 150B. The retailer may not have a custodial wallet and requires a deposit into a financial account of the retailer in U.S. dollars, here the liquidity account is used to transfer cash to the financial account and simultaneously the BC manager 116 debits the custodial account of the consumer based on a current value of the cryptocurrency type held in the consumer's custodial wallet and initiates the redeeming of USDC held in the liquidity wallet or redeeming of other cryptocurrency types over the BC using BC APIs 143 such that the liquidity wallet is debited on the BC by the amount of U.S. dollars transferred to the financial account of the retailer. Funds redeemed over the BC are held back in the liquidity account to account for the instantaneous transfer from the liquidity account to the financial account of the retailer. In this way, the liquidity account remains balanced. This demonstrates that retailers do not even have to officially accept any cryptocurrency as payment for transactions and do not have to have registered custodial wallets for their consumers to still use their own personal cryptocurrency to pay in cash for transactions with the retailers.

In still another situation, a consumer with a custodial wallet desires to transfer value funds to another consumer with a custodial wallet. The transfer is near instantaneous, and no BC operations are needed at all; rather, the corresponding ledgers for each of the custodial wallets are updated to perform the value transfer.

In yet another scenario, a consumer with a custodial wallet desires to transfer value funds to another recipient consumer as cash. The recipient consumer does not have a custodial wallet. The custodial wallet is debited, the BC operations are initiated to redeem USDC, or other cryptocurrency types associated with the sending consumer's custodial wallet from the liquidity wallet, and API 114 is used to send the cash to the recipient consumer's account with the cash service using funds from the liquidity account. In this case, cloud/server 110 maintains an account with the cash service for purposes of providing these types of transfers to consumers with registered custodial wallets.

Any value transfer is achieved in nano seconds by system 100 rather than in 10 minutes or more with current usages of cryptocurrencies as payment. Conversions between different types of cryptocurrencies and fiat currencies are achieved instantly, such that there are no limitations and even retailers that do not accept cryptocurrency can receive payments from consumers in their preferred fiat currencies. System 100 creates a lightning network node that interacts with the layer on top of the BC that opens, records, and closes value transfers. This layer is called the lightning network and consists of nodes that can achieve value transfers nearly instantaneously while still assuring that any BC operations on the BC are performed for the transfers and confirmed.

In addition, fees associated with value transfers are dramatically reduced over present financial and cryptocurrency value transfers. Custodial wallets permit custodial to custodial value transfers to be accessed no fee or minimal fees as designated by cloud/server 110 provider. Any non-custodial party to a value transfer can be achieved at substantially lower fees when the BC is accessed since the BC transfers can be designated for times when the BC is not busy and any nominal fee above the BC fee can be added by cloud/server 110 provider. Thus, not only do consumers and retailers get near instantaneous value transfers for transactions but they also achieve substantially lower value transfer fees.

The value transfers can occur between any three parties (at least one party is channel manager 115) from any three devices (one device is cloud/server 110) operated by the parties. For example, value transfers can be processed between two user-operated devices 130, between a user-operated device 130 and a terminal 120, between a user-operated device and a server 120, etc.

In an embodiment, terminal 120 is an SST, a POS terminal or an ATM.

In an embodiment, user-operated device 130 is a phone, a laptop, a desktop, a wearable processing device, a network-voice enabled device (Google Home®, Amazon Echo®, etc.), or any Internet-of-Things (IoTs) device.

The embodiments of FIG. 1 and other embodiments are now discussed with reference to the FIGS. 2-3.

Figure 2:
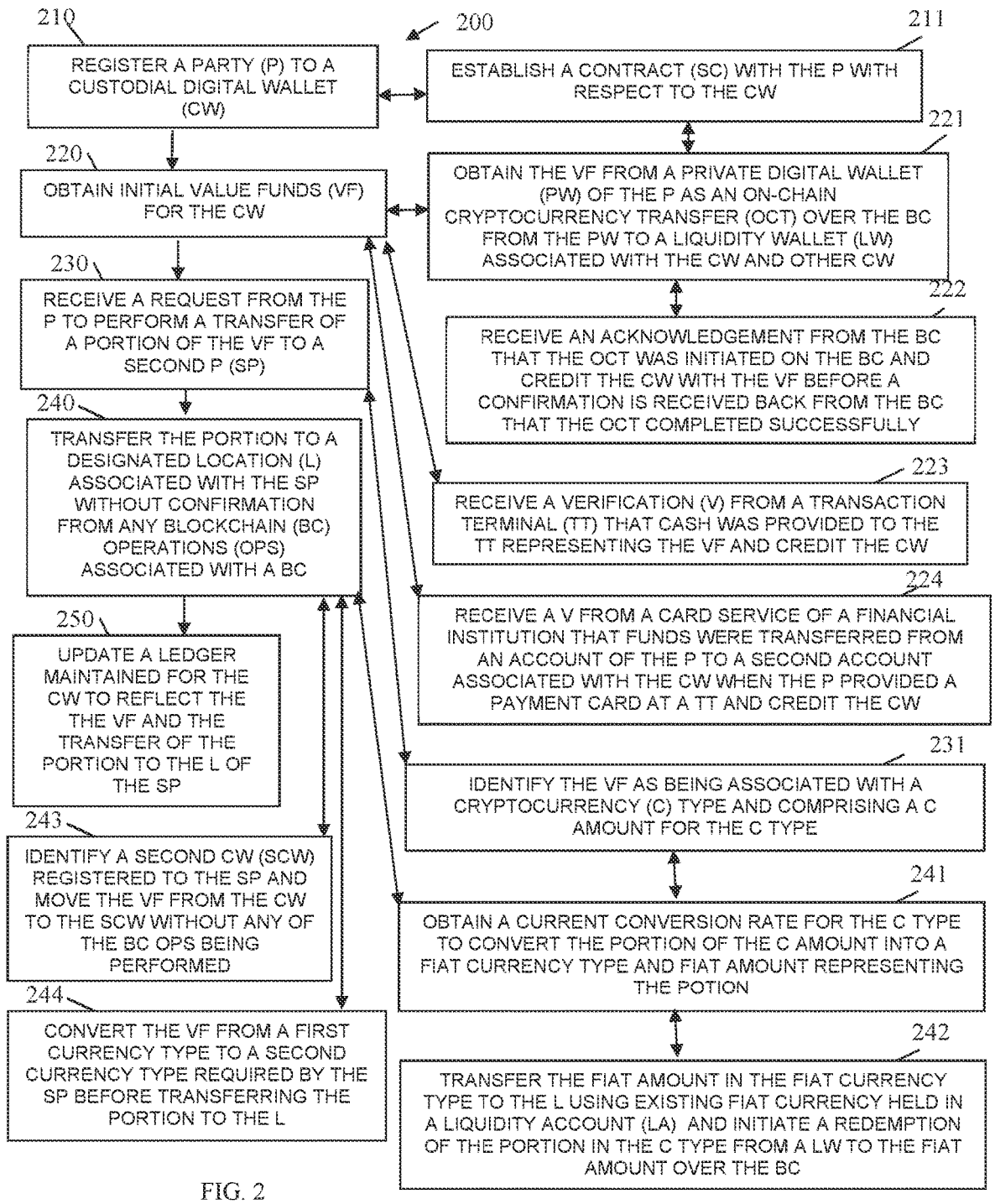
FIG. 2 is a diagram of a method for a near instantaneous terminal payment transfer over a blockchain using a decentralized network, according to an example embodiment.

FIG. 2 is a diagram of a method 200 for a near instantaneous terminal payment transfer over a blockchain using a decentralized network, according to an example embodiment. The software module(s) that implements the method 200 is referred to as a "value transfer service." The value transfer service is implemented as executable instructions programmed and residing within memory and/or a non-transitory computer-readable (processor-readable) storage medium and executed by a plurality of hardware processors of a plurality of hardware computing devices. The processors of the devices that execute the value transfer service are specifically configured and programmed to process the value transfer service. The value transfer service has access to one or more networks during its processing. The networks can be wired, wireless, or a combination of wired and wireless.

In an embodiment, the devices that execute the value transfer service is cloud 110 and/or server 110.

In an embodiment, the value transfer service is all or some combination of 113, 114, 115, 116, and/or 143, discussed above with system 100.

At 210, the value transfer service registers a party to a custodial wallet (as was discussed above). Registration may occur during an active online transaction of a consumer with a retailer's online server 120 and/or may occur during an in-store transaction at the retailer's transaction terminal 120. In some cases, registration may also occur independent of any transaction of a consumer via the consumer's device 130.

In an embodiment, at 211, the value transfer service establishes a contract with the party with respect to the custodial wallet defining the terms and conditions of the wallet.

At 220, the value transfer service obtains initial value funds for funding the custodial wallet from the party.

In an embodiment of 211 and 220, at 221, the value transfer service obtains the initial value funds from a private digital wallet of the party as an on-chain cryptocurrency transfer over the blockchain from the private digital wallet and into a liquidity wallet associated with the custodial digital wallet and other custodial digital wallets managed by the value transfer service.

In an embodiment of 221 and at 222, the value transfer service receives an acknowledgement from the blockchain that the on-chain cryptocurrency transfer was initiated on the blockchain. Once acknowledgement that the transfer was initiated is received, the value transfer service credits the custodial wallet with the initial value funds before confirmation is received back from the blockchain that the on-chain cryptocurrency transfer completed successfully.

In an embodiment, at 223, the value transfer service receives a verification from a transaction terminal 120 that cash was provided to the transaction terminal 120 representing the initial value funds. Once the verification is received, the value transfer service credits the custodial digital wallet with the initial value funds.

In an embodiment, at 224, the value transfer service receives a verification from a card service of a financial institution that funds were transferred from an account of the party to a second account associated with the custodial digital wallet when the party provided a payment card at a transaction terminal 120. Once the verification is received, the value transfer service credits the custodial digital wallet with the initial value funds.

At 230, the value transfer service receives a request from the party to perform a transfer of a portion of the initial value funds to a second party.

In an embodiment, at 231, the value transfer service identifies the initial value funds as being associated with a cryptocurrency type and comprising a cryptocurrency amount for the cryptocurrency type.

At 240, the value transfer service transfers the portion of the initial value funds to a designated location associated with the second party without confirmation from any blockchain operations associated with the blockchain.

In an embodiment of 231 and 240, at 241, the value transfer service obtains a current conversion rate for the cryptocurrency type to convert the portion of the cryptocurrency amount into a fiat currency type and a fiat amount representing the portion.

In an embodiment of 241 and at 242, the value transfer service transfers the fiat amount in the fiat currency type to the designated location using existing fiat currency held in a liquidity account and the value transfer service initiates a redemption of the portion in the cryptocurrency type from a liquidity wallet to the fiat amount over the blockchain.

In an embodiment, at 243, the value transfer service identifies a second custodial digital wallet registered to the second party and the value transfer service moves the initial value funds from the custodial digital wallet of the transferring party to the second custodial wallet of the second party without any blockchain operations. The corresponding ledgers for the wallets are also updated to reflect the value transfer.

In an embodiment, at 244, the value transfer service converts the initial value funds from a first currency type to a second currency type required by the second party before transferring the portion to the designated location of the second party.

In an embodiment, at 250, the value transfer service updates a ledger maintained for the custodial wallet to reflect the initial value funds and the transfer of the portion to the designated location of the second party.

Figure 3:
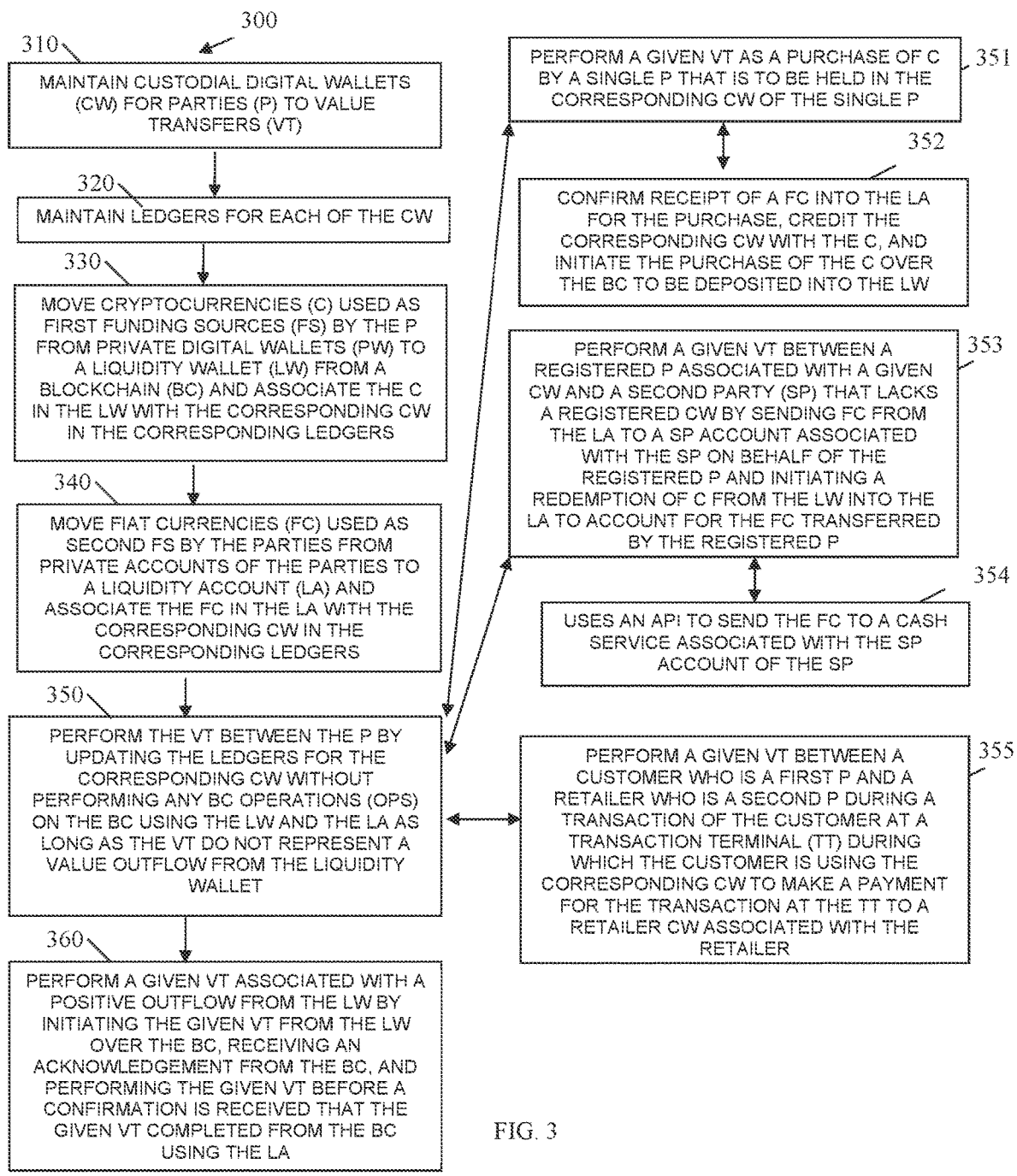
FIG. 3 is a diagram of another method for a near instantaneous terminal payment transfer over a blockchain using a decentralized network, according to an example embodiment.

FIG. 3 is a diagram of another method 300 for a near instantaneous terminal payment transfer over a blockchain using a decentralized network, according to an example embodiment. The software module(s) that implements the method 300 is referred to as a "cloud-based value transfer service." The cloud-based value transfer service is implemented as executable instructions programmed and residing within memory and/or a non-transitory computer-readable (processor-readable) storage medium and executed by one or more hardware processors of one or more hardware devices. The processors of the devices that execute the cloud-based value transfer service are specifically configured and programmed to process the cloud-based value transfer service. The cloud-based value transfer service has access to one or more networks during its processing. The networks can be wired, wireless, or a combination of wired and wireless.

The cloud-based value transfer service presents another and, in some ways, enhanced processing perspective of that which was described above with the method 200.

In an embodiment, cloud 110 executes the cloud-based value transfer service.

In an embodiment, the cloud-based value transfer service is all or some combination of 113, 114, 115, 116, 123, 133, 143, and/or method 200.

At 310, the cloud-based value transfer service maintains custodial digital wallets for parties to value transfers.

At 320, the cloud-based value transfer service maintains ledgers for each of the custodial wallets.

At 330, the cloud-based value transfer service moves cryptocurrencies uses as first funding sources by the parties from private digital wallets to a liquidity wallet from a blockchain and associates the cryptocurrencies with the corresponding custodial digital wallets in the corresponding ledgers.

At 340, the cloud-based value transfer service moves fiat currencies uses as second funding sources by the parties from private accounts of the parties to a liquidity account and associates the fiat currencies in the liquidity account with the corresponding custodial digital wallets in the corresponding ledgers.

At 350, the cloud-based value transfer service performs the value transfers between the parties by updating the ledgers for the corresponding custodial digital wallets without performing any blockchain operations on the blockchain using the liquidity wallet and the liquidity account as long as the value transfers do not represent a value outflow from the liquidity wallet.

In an embodiment, at 351, the cloud-based value transfer service performs a given value transfer as a purchase of cryptocurrency by a single party that is to be held in the corresponding custodial digital wallet by the single party.

In an embodiment of 351 and at 352, the cloud-based value transfer service confirms receipt of a fiat currency into the liquidity account for the purchase, credits the corresponding custodial digital wallet with the cryptocurrency, and initiates the purchase of the cryptocurrency over the blockchain to be deposited in the liquidity wallet.

In an embodiment, at 353, the cloud-based value transfer service performs a given value transfer between a registered party associated with a given custodial digital wallet and a second party that lacks a registered custodial digital wallet by sending the fiat currency from the liquidity account to a second party account associated with the second party on behalf of the registered party and initiating a redemption of the cryptocurrency from the liquidity wallet into the liquidity account for the fiat currency transferred by the registered party.

In an embodiment of 353 and at 354, the cloud-based value transfer service uses an API to send the fiat currency to a cash service associated with the second party account of the second party.

In an embodiment, at 355, the cloud-based value transfer service performs a given value transfer between a customer who is a first party and a retailer who is a second party during a transaction of the customer at a transaction terminal during which the customer is using the corresponding custodial digital wallet to make a payment for the transaction at the transaction terminal to a retailer custodial digital wallet associated with retailer.

In an embodiment, at 360, the cloud-based value transfer service performs a given value transfer associated with a positive outflow from the liquidity wallet by initiating the given value transfer over the blockchain, receiving an acknowledgement from the blockchain, and performing the given value transfer before a confirmation is received that the given value transfer completed on the blockchain using the liquidity account.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   maintaining custodial digital wallets for parties to value transfers;
   maintaining ledgers for each of the custodial digital wallets;
   moving cryptocurrencies used as first funding sources by the parties from private digital wallets to a liquidity wallet from a blockchain and associating the cryptocurrencies in the liquidity wallet with corresponding custodial digital wallets in corresponding ledgers;
   moving fiat currencies used as second funding sources by the parties from private accounts of the parties to a liquidity account and associating the fiat currencies in the liquidity account with the corresponding custodial digital wallets in the corresponding ledgers;
   performing the value transfers between the parties by updating the ledgers for the corresponding custodial digital wallets without performing any blockchain operations on the blockchain using the liquidity wallet and the liquidity account as long as the value transfers do not represent any value outflow from the liquidity wallet; and
   receiving an acknowledgement from the blockchain that an on-chain cryptocurrency transfer was initiated on the blockchain and crediting a custodial digital wallet with value funds before confirmation is received back from the blockchain that the on-chain cryptocurrency transfer completed successfully.

2. The method of claim 1 further comprising:
   performing a given value transfer associated with a positive value outflow from the liquidity wallet by initiating the given value transfer from the liquidity wallet over the blockchain.

3. The method of claim 1, wherein performing further includes performing a given value transfer as a purchase of cryptocurrency by a single party that is to be held in a particular custodial digital wallet of the single party.

4. The method of claim 3, wherein performing further includes confirming receipt of a fiat currency into the liquidity account for the purchase, crediting the particular custodial digital wallet with the cryptocurrency, and initiating the purchase of the cryptocurrency over the blockchain to be deposited into the liquidity wallet.

5. The method of claim 1, wherein performing further includes performing a given value transfer between a registered party associated with a given custodial digital wallet and a second party that lacks a registered custodial digital wallet by sending fiat currency from the liquidity account to a second party account associated with the second party on behalf of the registered party and initiating a redemption of cryptocurrency from the liquidity wallet into the liquidity account to account for the fiat currency transferred by the registered party.

6. The method of claim 5, wherein performing further includes using an Application Programming Interface (API) to send the fiat currency to a cash service associated with the second party account of the second party.

7. The method of claim 1, wherein performing further includes performing a given value transfer between a customer who is a first party and a retailer who is a second party during a transaction of the customer at a transaction terminal during which the customer is using a particular custodial digital wallet to make a payment for the transaction at the transaction terminal to a retailer custodial digital wallet associated with the retailer.

* * * * *